Patented Aug. 1, 1950

2,516,914

UNITED STATES PATENT OFFICE 2,516,914

EMULSIFICATION-INHIBITED POLYACRYLATE-CONTAINING OIL COMPOSITIONS

Anthony J. Revukas, Cranford, N. J., assignor to Tide Water Associated Oil Company, Bayonne, N. J., a corporation of Delaware No Drawing. Application March 21, 1947, Serial No. 736,418

8 Claims. (Cl. 252—32.5)

The present invention relates to oil compositions and, more particularly, to improved oil compositions that resist emulsification with water and suppress formation of rust on metal surfaces in the presence of water. More specifically, the invention is directed to compositions comprising a major proportion of oil containing a polymeric ester of the acrylic series in an amount sufficient to improve the lubricating properties of the oil and minor proportions of an amine and an acid ester of a phosphorus acid.

Oil-soluble polymerized esters of the acrylic series are known to be valuable additives for oils to impart certain desired characteristics thereto, as for example, to depress the pour point, to improve the viscosity index, to maintain lubricating surfaces substantially free of undesirable gum or other deposits, and the like. However, although such polymers impart certain desired properties to oils, under some conditions, as for example, wherein water, steam, moisture and the like, can come into contact with the polymer-containing oil, the polymerized esters of the acrylic series tend to induce emulsification. Such emulsion formation is highly undesirable, as it interferes with the performance efficiency of the oil composition and is particularly objectionable in oils used for lubrication purposes, for example, in the lubricating of steam turbines, Diesel engines, and other mechanisms. Furthermore, the use of a polymeric ester of the acrylic series in oils does not impart rust inhibiting characteristics to the oils, and consequently, in order that such polymer-containing oils may have suitable rust-inhibiting properties, it is generally necessary to add rust-inhibiting additives thereto. However, as far as applicant is aware, additives used heretofore do not perform the dual function of substantially imparting rust-inhibiting properties to oils containing polymerized esters of the acrylic series and suppressing the tendency of the polymeric esters of the acrylic series to induce emulsification of the oil composition. It is highly desirable, therefore, to prepare oil compositions, containing polymeric esters of the acrylic series, that have rust-inhibiting characteristics and at the same time suppress the emulsification tendency of the acrylic polymers.

However, any additive component not only must be effective in the dual capacity referred to, but must be compatible with other components present. It must be of such character as not to affect the desirable properties or functions of the oil and of the acrylic polymer components during the contemplated use of the oil composition. Certain compounds, while of known demulsifying or rust-preventing character, either will not perform both of these functions when present in the oils under consideration, or will deleteriously affect desirable properties of the oil composition such as its resistance to bearing corrosion or other desired characteristic of the lubricating oil.

It is an object of the present invention to provide improved oil compositions containing polymerized esters of the acrylic series by incorporating therein an additive that imparts rust inhibiting characteristics and suppresses the emulsion forming tendency of the acrylic ester polymers, while at the same time, maintaining the beneficial properties imparted to the oil by the acrylic ester polymers.

Generally speaking, the oil compositions particularly adapted for treatment in accordance with the present invention are mineral oils and fractions thereof containing polymeric esters of the acrylic series, such esters generally having the basic structure:

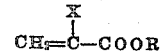

$$CH_2=C-COOR$$

wherein X represents a hydrogen atom or an alkyl group, e. g., a methyl group, and R is a monovalent hydrocarbon radical. In general, when employing such polymers in oils, and the simple esters are used, R preferably contains more than four carbon atoms as use of radicals containing such a relatively high number of carbon atoms usually provides improved solubility of the polymers in oils. Hence, particularly suitable polymers of the simple esters include those of the foregoing formula wherein R contains at least four and preferably from eight to eighteen carbon atoms. Typical examples of such polymers of the acrylic ester series include amyl, hexyl, cyclohexyl, decyl, cetyl, octadecyl, and the like, esters of acrylic or α-methacrylic acids. Furthermore, mixtures of such polymers may likewise be used. In addition to the polymers of the simple esters, as hereinbefore described, their copolymers may also be used. In general, such adjuvants for oils preferably comprise copolymers of esters having an alcohol group of not more than five carbon atoms and of esters derived from an alcohol group of more than five carbon atoms, as such copolymers generally having improved solubility characteristics in oils. The amount of polymeric esters of the acrylic series incorporated into oils may be varied depending on several factors, as for example, the type of oil and the particular polymeric ester used, the solubility of the polymers in the oil, and the like, but for most purposes, the amount of polymer used generally varies from about 0.1% to about 5% based upon the weight of the oil.

The present invention is based upon the discovery that rust-immunizing and demulsifying characteristics may be imparted to oils whose emulsifying tendency is enhanced by the presence therein of acrylic ester polymers. These desired properties are imparted to the polymer-containing oil by incorporating therein a combination additive comprising a suitable amine and an acid ester of a phosphorus acid in regulated amounts as is more fully described hereinafter.

With reference to the amine component of the additive embodied herein, amines or mixtures thereof that are oil-soluble and substantially water-insoluble may be suitably employed. In a preferred embodiment, tertiary amines are used, suitable examples thereof being the oil-soluble substantially water-insoluble aliphatic amines, aralkyl alkyl amines, and the like. In a still more preferred embodiment, the present invention is concerned with use of tertiary amines as may be illustrated by the following formula:

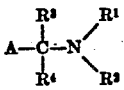

wherein $R^1$ and $R^2$ are the same or different hydrocarbon groups, $R^3$ and $R^4$ are hydrogen or hydrocarbon radicals, and A is a phenol grouping containing one or more hydrocarbon substituent on the nucleus. Furthermore, it is preferable that the carbon atoms in the sum of $R^1$ and $R^2$ should total at least seven. Examples of suitable amines falling within the preferred embodiment are the phenylol dialkyl amines, particularly suitable examples being cardanylolmethyl dialkyl amines, including diamylaminomethyl cardanol, dibutylaminomethyl cardanol, dilaurylaminomethyl cardanol, di-2-ethylhexylaminomethyl cardanol, and the like, as well as other tertiary amines, including diamylaminomethyl para tert.-amyl phenol, diamylaminomethyl 2,4-diamyl phenol, pentadecylphenylolmethyl diamylamine, and the like. Suitable amine salts for use in practice of the present invention are also disclosed and claimed as new compounds in my copending application, Serial No. 725,729, filed January 31, 1947.

The other essential component of the novel additive embodied herein for use with an amine to instill rust-inhibiting and emulsion-suppressing properties to acrylic ester polymer-containing oils comprises acid esters of phosphorus acids and/or mixtures thereof that are soluble in oils and substantially insoluble in water. In a preferred embodiment, acid esters of phosphorus acids, as for example, the partially esterified derivatives of orthophosphoric acid are employed. Suitable examples thereof include the mono- and di-aliphatic esters of ortho phosphoric acid and mixtures thereof. Still more preferable, the mono- and di-aliphatic acid esters of phosphorus acids that have at least one hydrocarbon radical containing a relatively high number of carbon atoms are employed. Such esters generally contain at least one hydrocarbon radical having at least about 4 carbon atoms, and more preferably from about 8 to 20 carbon atoms, as such esters usually have the desired oil solubility and are substantially water-insoluble. More specific examples of acid esters of phosphorus acids that are suitable for practicing my invention are the partially esterified long-chain aliphatic esters of ortho phosphoric acid as may be illustrated by mono- and di-lauryl acid ortho phosphate, mixtures thereof, and the like.

Generally speaking, when added to the oil under treatment, an amount of additive as low as 0.01% by weight comprising the sum of the amine and the acid ester of phosphorus acid imparts rust-inhibiting characteristics and suppresses the tendency of the acrylic ester polymers to induce emulsification of the oil. If the amine and the acid phosphate ester are added individually to the oil, the amine and the acid phosphate ester react in the oil to form the amine salt of the acid phosphate employed. Accordingly, the proportion of amine to acid phosphate ester added to the oil should comprise an amount of amine at least sufficient to react with the acid phosphate ester to form a concentration of at least about 0.01% of the salt thereof based on the weight of oil. Although concentrations of the additive as low as 0.01% in the oil impart rust-inhibiting and demulsifying characteristics to the oil compositions as embodied herein, for some purpose, particularly when the oil composition is to be used under severe conditions inducing rusting of metal parts, a concentration exceeding 0.01% of the amine-acid phosphate ester salt is usually employed. Thus for example, when the oil composition is subjected to severe rust promoting conditions, such as when in contact with salt water, it is preferable that the amine and acid ester be incorporated in the oil employing an amount of amine at least sufficient to provide a concentration of about 0.05% to 0.1% by weight of the salt thereof based on the weight of oil. A concentration of amine and the acid ester sufficient to provide an amount of salt thereof exceeding about 0.05% to 0.1% by weight in the oil may be used, as for example, up to 0.2% or even higher, but for most purposes, a concentration of components sufficient to form about 0.05% by weight of the salt provides highly effective rust-inhibiting and demulsifying characteristics for oil compositions whose emulsification tendency is induced by the polymeric esters of the acrylic series.

Regarding the ratio of amine to the acid ester as employed herein, it is within the scope of the present invention to use an excess of amine over and above the quantity required to form an effective amount of amine-acid ester salt in the oil. Thus, for example, I have found that excess amine may be used without deleteriously affecting the rust inhibiting and demulsifying characteristics imparted to the polymer containing oils by the presence therein of the amine acid ester salt. In fact, in some cases, an excess of amine actually enhances the performance of the polymer-containing oils. When used individually, the amines and phosphate esters as embodied herein do not impart both demulsifying and rust-inhibiting characteristics to the polymer-containing oils. It is by use of these two components in combination in the oil that they perform the dual function of imparting rust-inhibiting and demulsifying characteristics. Accordingly, although an amount of the acid ester in excess of that required to form an effective amount of salt thereof with the amine may be used without deleteriously affecting the demulsifying characteristics of the additive, it is preferred that the amount of acid ester employed should not substantially, if at all, exceed the amount required to form addition salts with the amine, as an excess of acid ester may in some cases tend to deleteriously affect the rust inhibiting characteristics imparted to the oil.

In order to further describe my invention, and to illustrate certain embodiments thereof, several examples are set forth hereinafter. In each of the examples, the procedure employed for determining demulsifying characteristics was in accordance with Navy Emulsion Test (Federal Specification VV-L-791b, Method 320.13), designated hereinafter as Test Procedure A. When reference is made herein to rusting tests, the test employed was in accordance with Navy 2190T Salt Water Corrosion Test (Specification 14-0-15 (INT), F-C (3), March 1, 1943), which consists in suspending a polished steel specimen in a mixture of the oil under test with 10% by volume of synthetic sea water containing 11 grams of $MgCl_2 \cdot 6H_2O$, 1.2 grams $CaCl_2$, 4.0 grams $Na_2SO_4$ and 25 grams NaCl per liter and agitating for 48 hours at 140° F.

TEST PROCEDURE A

The apparatus employed comprises a motor-driven mixer, a 100 ml. graduate, and a constant temperature bath.

80 ml. of the test composition consisting of 40 ml. of test oil and 40 ml. of distilled water or 1% salt (NaCl) solution are poured into the graduate and the composition is brought to a temperature of about 130° F. When the test composition reaches this temperature, it is stirred for 5 minutes at 1500 revolutions per minute while maintaining the 130° F. temperature whereby the composition is emulsified. After the 5-minute stirring is completed, the emulsified composition is maintained at the 130° F. temperature without additional agitation. The test composition is observed at 5-minute intervals up to a 60-minute period. At each interval, it is noted whether the emulsion has been completely separated into a layer of water and a layer of oil, or whether an oil-water emulsion is still present. If the emulsion has not been completely broken, the amount that is present is recorded as "milliliters of cuff" by direct reading on the graduate at the 30-minute and 60-minute readings. When emulsion is present, the test composition comprises a bottom layer of water, a top layer of oil, and an intermediate layer of emulsion which is recorded as "milliliters of cuff."

EXAMPLE I

A test composition was prepared by dissolving 3% by weight of "Acryloid 150" in an oil of lubricating grade that had good demulsifying properties, in that it demulsified within about 5 minutes when subjected to Test Procedure A. "Acryloid 150" is understood to contain about 40% by weight of a copolymer type resin of methacrylic acid esters, in which one of the ester groupings is derived from lauryl alcohol, dissolved in 60% by weight of a Mid-Continent neutral oil.

The foregoing test composition was subjected to the conditions of Procedure A using distilled water. At the 30-minute reading, 67 ml. of the original 80 ml. under test was in emulsified form, the high degree of emulsification being induced by the acrylic ester polymer in the oil.

The foregoing test composition was also tested in accordance with the rusting test set forth hereinbefore, and failed to pass the test in that considerable rusting was present in the steel specimen on examination after the 48-hour immersion in the synthetic sea water.

EXAMPLE II

A test composition was prepared by dissolving 3% of the following additive in a lubricating oil of the same grade as used in Example I.

*Additive composition*

| | Per cent |
|---|---|
| "Acryloid 150" (40% polymer, 60% Mid-Continent neutral) | 98.36 |
| Diamylaminomethyl cardanol | 1.15 |
| Laurylacidorthophosphates (mixture of mono- and di-lauryl acid orthophosphate) | 0.49 |
| | 100.00 |

The composition of this example was, therefore, very similar to that of Example I, the major difference being that the composition of this example contained the amine and acid phosphate esters, the amount of amine used being slightly in excess of that required to neutralize the acid phosphate esters.

The foregoing composition was subjected to the conditions of Procedure A. When distilled water was used, the emulsion of polymer-containing oil and water resolved within 16 minutes, and within 17 minutes with salt water, thus illustrating the effective demulsifying capacity of the amine-phosphate ester additive for the oil containing acrylic ester polymers inducing emulsification.

The oil composition of this example was also subjected to the rusting test referred to hereinbefore and satisfactorily passed the same in that no evidence of rusting was present on the steel specimen after the 48-hour immersion, thereby illustrating the excellent rest-inhibiting characteristics imparted to the oil composition by incorporating therein about 0.05% of the additive comprising 0.035% of the amine and 0.015% of the acid phosphates.

EXAMPLE III

A test composition was prepared that was similar to that of Example II, except that the total amount of amine-phosphate ester additive and acrylic ester polymer was only about ⅓ of the amount used in Example II. In other words, the sum of the amine and phosphate ester was about 0.016% based on the weight of oil. When tested in accordance with Procedure A, using distilled water, the acrylic ester polymer containing-oil demulsified in 10 minutes, and with salt water, in 11 minutes. Moreover, this test composition satisfactorily passed the foregoing described rust test when tested in accordance therewith except for use of distilled water in place of synthetic sea water.

EXAMPLE IV

A test composition was prepared by dissolving 3% by weight of "Acryloid 710" in an oil of lubricating grade as set forth in Example I. "Acryloid 710" is understood to contain about 40% by weight of a copolymer type resin of acrylic acid esters, said resin having a higher molecular weight than that of Acryloid 150, dissolved in Mid-Continent neutral oil.

The foregoing test composition was subjected to the conditions of Procedure A and at 30 minutes, at least 65 ml. of the original 80 ml. were in emulsified form, showing that the acrylic ester polymer induced emulsification.

This test composition failed to pass the rusting test set forth hereinbefore in that considerable rusting occurred on the steel specimen in the 48-hour immersion test.

EXAMPLE V

A test composition was prepared by dissolving 3% of the following additive in a lubricating oil of the same grade used in Example IV.

*Additive composition*

| | Per cent |
|---|---|
| "Acryloid 710" (40% polymer, 60% Mid-Continent neutral) | 98.36 |
| Diamylaminomethyl cardanol | 1.15 |
| Laurylacidorthophosphates | 0.49 |
| | 100.00 |

The composition of this example was, therefore, very similar to that of Example IV, the main difference being that the composition of this example contained the amine and acid phosphate esters, the amount of amine used being slightly in excess of that required to neutralize the acid phosphate esters.

The test composition of this example was subjected to the conditions of Procedure A. When distilled water or salt water was used, the emulsion formed on mixing the oil with water resolved within 17 minutes.

This composition had excellent rust-inhibiting characteristics in that it passed the rusting test described hereinbefore with no evidence of rusting of the steel specimen.

EXAMPLE VI

A test composition was prepared that was similar to that of Example V except that the total amount of amine-phosphate additive and acrylic ester polymer was about ⅓ of the amounts used in Example V. When tested in accordance with Procedure A, the emulsion formed by water with the composition containing the acrylic polymer, amine and phosphate ester resolved within 11 minutes when distilled or salt water was used.

In practicing my invention, various methods may be employed for treating oil compositions to impart thereto the desired properties embodied herein. For example, the oil may be compounded with the amine and acid phosphate ester by adding these components individually in desired proportions to the oil composition, or the amine and acid phosphate ester may be prepared as a salt or mixture in desired proportions and added as such to the oil to be treated. Likewise, the amine and acid phosphate ester may be prepared as solutions or dispersions in suitable vehicles therefor, as for example, in vehicles that do not deleteriously affect the oil to be treated. Mineral oils and fractions thereof may be suitably employed for this purpose. Furthermore, the amine and acid phosphate may be added to oils already containing a polymeric ester of the acrylic series, or to oils to which such polymeric esters are to be subsequently added. Moreover, the amine and acid ester may be conveniently added to the oil in combination with a polymeric ester of the acrylic series. By employing the latter method, a single additive comprising an amine, acid ester of a phosphorus acid and acrylic ester polymer is used whereby the oil is provided with the desired properties of the acrylic ester polymer, the amine-acid phosphate ester suppresses the emulsifying tendency of the polymer, and rust-inhibiting characteristics are imparted to the oil composition while at the same time maintaining the beneficial properties of the acrylic ester polymers. Such a novel additive may comprise the amine, phosphate and polymeric ester per se, or these components may be prepared as solutions or dispersions in suitable vehicles therefore, e. g., a mineral oil or fraction thereof. More specifically, a suitable example of such a novel additive may comprise a major proportion of a suitable vehicle, e. g., a mineral oil, containing a polymeric ester of the acrylic series, and the desired amounts of an amine and acid phosphate ester as embodied herein. In further illustration, the foregoing examples set forth such a novel additive composition that is suitable for practicing this aspect of the invention, the additive containing a major amount by weight of an oil containing a minor proportion of a polymeric ester of the acrylic series, and minor proportions of diamylaminomethyl cardanol and lauryl acid orthophosphates in desired amounts.

Although the present invention has been described in conjunction with certain preferred embodiments thereof, those skilled in the art will readily recognize that variations and modifications can be made. Such variations and modifications are to be considered to be within the purview of the specification and the scope of the appended claims.

I claim:

1. A liquid lubricating composition comprising a mineral oil having dissolved therein a small amount, sufficient to improve the viscosity index characteristics of the oil but enhancing emulsification thereof, of an oil-soluble polymerized ester of the general formula:

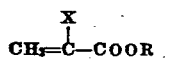

wherein X is a member of the class consisting of hydrogen and a methyl radical and R represents a saturated hydrocarbon group of about 4 to about 18 carbon atoms, and a small amount, sufficient to inhibit the emulsification-enhancing tendency imparted to said oil by said polymerized ester, of a substantially water-insoluble oil-soluble salt formed by an alkyl acid ester of phosphoric acid with a dialkyl aminomethyl phenol, said dialkyl aminomethyl phenol being further characterized in that the phenol contains an aliphatic group as a substituent for a nuclear hydrogen atom.

2. A liquid lubricating composition comprising a hydrocarbon oil having dissolved therein (a) a small amount, sufficient to improve the viscosity index characteristics of the oil but enhancing emulsification thereof, of an oil-soluble polymerized ester of the general formula:

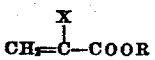

wherein X is a member from the group consisting of hydrogen and a methyl radical and R represents a saturated hydrocarbon group of about 4 to about 18 carbon atoms and (b) a small amount, sufficient to substantially reduce the emulsification-enhancing tendency imparted to said oil by said polymerized ester, of a hydrocarbon-soluble salt formed by an alkylaminomethylaryiol with an acid ester of phosphoric acid.

3. A composition, as defined in claim 2, wherein the polymerized ester is a polymerized ester of methacrylic acid.

4. A composition, as defined in claim 2, wherein the acid ester of phosphoric acid contains a long chain hydrocarbon group.

5. A composition, as defined in claim 1, wherein the polymerized ester is a polymerized ester of methacrylic acid.

6. A composition, as defined in claim 1, wherein the dialkyl aminomethyl phenol contains a sum of at least seven carbon atoms in the dialkyl group.

7. A composition, as defined in claim 1, wherein the dialkylaminomethyl phenol is a dialkylaminomethyl cardanol.

8. A composition, as defined in claim 7, wherein the dialkylaminomethyl phenol is diamylaminomethyl cardanol.

ANTHONY J. REVUKAS.

REFERENCES CITED

The following references are of record in the file of this patent:

UNITED STATES PATENTS

| Number | Name | Date |
| --- | --- | --- |
| 2,167,867 | Benning | Aug. 1, 1939 |
| 2,330,773 | Zimmer | Sept. 28, 1943 |
| 2,363,134 | McCleary | Nov. 21, 1944 |
| 2,397,381 | Smith | Mar. 26, 1946 |
| 2,399,510 | Rocchini | Apr. 30, 1946 |
| 2,407,954 | Fenske | Sept. 17, 1946 |
| 2,411,671 | Smith | Nov. 26, 1946 |
| 2,413,852 | Turner | Jan. 7, 1947 |
| 2,431,011 | Zimmer | Nov. 18, 1947 |

OTHER REFERENCES

"Emulsions and Foams," Berkman and Egloff, Reinhold Pub. Co., 1941, page 112.